United States Patent
Kasama (10) Patent No.: US 9,229,023 B2
(45) Date of Patent: Jan. 5, 2016

(54) ELECTRONIC APPARATUS, MOBILE TERMINAL, AND VELOCITY MEASURING METHOD

(71) Applicant: FUJITSU LIMITED, Kawasaki-shi, Kanagawa (JP)

(72) Inventor: Kouichirou Kasama, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 14/251,166

(22) Filed: Apr. 11, 2014

(65) Prior Publication Data
US 2014/0222368 A1   Aug. 7, 2014

Related U.S. Application Data

(63) Continuation of application No. PCT/JP2011/076221, filed on Nov. 14, 2011.

(51) Int. Cl.
| | | |
|---|---|---|
| *G01P 3/68* | (2006.01) | |
| *G01C 21/00* | (2006.01) | |
| *G06F 17/40* | (2006.01) | |
| *G06F 19/00* | (2011.01) | |
| *G01P 3/36* | (2006.01) | |
| *G01S 7/48* | (2006.01) | |
| *G01S 17/08* | (2006.01) | |
| *G01S 17/58* | (2006.01) | |

(Continued)

(52) U.S. Cl.
CPC . *G01P 3/36* (2013.01); *G01C 21/00* (2013.01); *G01P 3/68* (2013.01); *G01S 7/4808* (2013.01); *G01S 17/08* (2013.01); *G01S 17/58* (2013.01); *G01S 17/87* (2013.01); *G01S 17/88* (2013.01); *G06F 17/40* (2013.01); *G06F 19/00* (2013.01)

(58) Field of Classification Search
None
See application file for complete search history.

(56) References Cited

U.S. PATENT DOCUMENTS

| | | | |
|---|---|---|---|
| 6,272,443 B1 * | 8/2001 | Motzko | 702/143 |
| 2002/0103035 A1 | 8/2002 | Lindsay | |

(Continued)

FOREIGN PATENT DOCUMENTS

| | | |
|---|---|---|
| JP | 61-038563 U | 3/1986 |
| JP | 05-056560 A | 3/1993 |

(Continued)

OTHER PUBLICATIONS

International Preliminary Report on Patentability for PCT Application No. PCT/JP2011/076221, mailed May 30, 2014.

(Continued)

*Primary Examiner* — Edward Cosimano
(74) *Attorney, Agent, or Firm* — Maschoff Brennan (57) ABSTRACT

An electronic apparatus includes a processor configured to select a type of an object subject to measurement; calculate a first distance to the object, based on output of a first sensor configured to detect passing of the object; calculate a second distance to the object, based on output of a second sensor configured to detect passing of the object; obtain based on the first distance, a first time point at which the object passes the first sensor; obtain based on the second distance, a second time point at which the object passes the second sensor; and calculate based on the first and second time points and a distance between the first and second sensors, a velocity of the object. The processor drives the first and second sensors at measurement time intervals corresponding to the type, and causes the first and the second sensors to detect the passing of the object.

9 Claims, 8 Drawing Sheets

(51) Int. Cl.
*G01S 17/87* (2006.01)
*G01S 17/88* (2006.01)

(56) References Cited

U.S. PATENT DOCUMENTS

| | | |
|---|---|---|
| 2004/0149939 A1 | 8/2004 | Dickson et al. |
| 2005/0242306 A1 | 11/2005 | Sirota et al. |
| 2008/0220940 A1 | 9/2008 | Kasama |
| 2009/0239672 A1 | 9/2009 | You |
| 2010/0194595 A1 | 8/2010 | Mimeault et al. |

FOREIGN PATENT DOCUMENTS

| | | |
|---|---|---|
| JP | 06-013517 Y2 | 4/1994 |
| JP | 06-028739 U | 4/1994 |
| JP | 2001-050801 A | 2/2001 |
| JP | 2002-157679 A | 5/2002 |
| JP | 2004-528662 A | 9/2004 |
| JP | 2005-260885 A | 9/2005 |
| JP | 2007-225550 A | 9/2007 |
| JP | 2007-325713 | 12/2007 |
| JP | 2008-220498 A | 9/2008 |
| JP | 2009-513314 A | 4/2009 |
| JP | 2010-145085 A | 7/2010 |

OTHER PUBLICATIONS

EESR of European Patent Application 11875927.3 dated Mar. 6, 2015.
Office Action of Japan Patent Application 2013-544015 dated Feb. 3, 2015. Translation of the relevant part, p. 2, line 16 to p. 3, line 11 of the Office Action. Partial translation of the Office Action.
International Search Report dated Dec. 13, 2011 in application No. PCT/JP2011/076221.
JPOA,, Office Action of Japan Patent Application 2013-544015 dated Sep. 8, 2015. Translation of the relevant part 1, p. 1, line 12 to p. 2, line 13 of the Office Action. Partial translation of the Office Action.

* cited by examiner

| ITEM | TYPE | MEASUREMENT TIME INTERVAL |
|---|---|---|
| 1 | GOLF | 0.07 ms |
| 2 | BATTING | 0.04 ms |
| 3 | TENNIS | 0.15 ms |

ELECTRONIC APPARATUS, MOBILE TERMINAL, AND VELOCITY MEASURING METHOD

CROSS REFERENCE TO RELATED APPLICATIONS

This application is a continuation application of International Application PCT/JP2011/076221, filed on Nov. 14, 2011 and designating the U.S., the entire contents of which are incorporated herein by reference.

FIELD

The embodiments discussed herein are related to an electronic apparatus, a mobile terminal, and velocity measuring method.

BACKGROUND

According to one conventional apparatus that measures the velocity of a moving object, three or more trajectory weight measuring units are disposed along a direction in which a vehicle travels and the velocity of the vehicle is calculated based on differences of the times measured by the trajectory weight measuring units (see, e.g., Japanese Laid-Open Patent Publication No. 2001-50801). According to another apparatus, one infrared sensor are disposed to measure the time that elapses from the time that the head of a train passes a point until the time that the tail of the train passes the point and the velocity of the train is computed based on the detected time that elapses and the length of the train as determined by the formation of the train (see, e.g., Japanese Laid-Open Utility Model No. H6-28739).

However, according to the one conventional apparatus, the velocity is calculated based on the weight of the object subject to measurement and therefore, a problem arises in that the velocity cannot be measured of an object whose weight cannot be measured. For example, the velocity cannot be measured of an object that is not in contact with the ground such as a head of a golf club, a bat, or a tennis racket that is being swung. The other conventional apparatus calculates the velocity based on the length of the object subject to measurement and therefore, a problem arises in that the velocity cannot be measured of an object whose length is not known in advance. For example, a problem arises in that the velocity cannot be measured of an object such as the head of a golf club whose length differs according to club.

SUMMARY

According to an aspect of an embodiment, an electronic apparatus includes a processor configured to select a type of an object subject to measurement; calculate a first distance to the object subject to measurement, based on an output of a first sensor configured to detect passing of the object subject to measurement; calculate a second distance to the object subject to measurement, based on an output of a second sensor configured to detect passing of the object subject to measurement; obtain based on the first distance, a first time point at which the object subject to measurement passes the first sensor; obtain based on the second distance, a second time point at which the object subject to measurement passes the second sensor; and calculate based on the first and the second time points and a distance between the first and the second sensors, a velocity of the object subject to measurement. The processor drives the first and the second sensors at measurement time intervals corresponding to the type, and causes the first and the second sensors to detect the passing of the object subject to measurement.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Embodiments of an electronic apparatus, a mobile terminal, and a velocity measuring method will be described in detail with reference to the accompanying drawings. The present invention is not limited by the embodiments.

Figure 1:
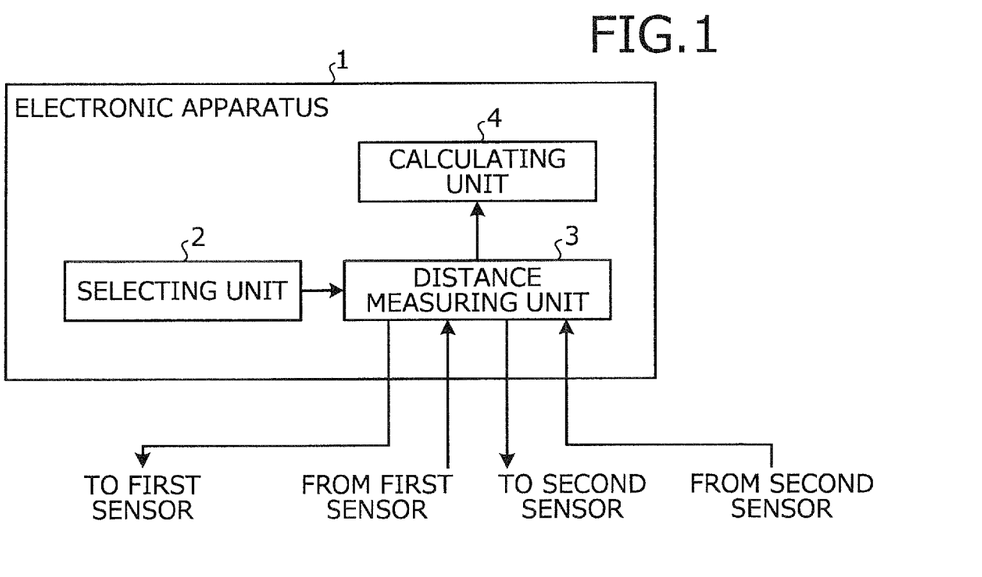
FIG. 1 is a block diagram of an electronic apparatus according to a first embodiment.

FIG. 1 is a block diagram of an electronic apparatus according to a first embodiment. As depicted in FIG. 1, an electronic apparatus 1 includes a selecting unit 2, a distance measuring unit 3, and a calculating unit 4. The selecting unit 2 selects the type of an object subject to measurement.

The distance measuring unit 3 drives, at measurement time intervals corresponding to the type selected by the selecting unit 2, non-depicted first and second sensors each detecting the passing of the object subject to measurement, to cause the sensors to detect the passing of the object subject to measurement, by the sensors; calculates a first distance to the object subject to measurement, based on the output of the first sensor; and further calculates a second distance to the object subject to measurement, based on the output of the second sensor.

The calculating unit 4 obtains a first time point at which the object subject to measurement passes the first sensor, based on the first distance calculated by the distance measuring unit 3; obtains a second time point at which the object subject to measurement passes the second sensor, based on a second distance calculated by the distance measuring unit 3; and calculates the velocity of the object subject to measurement, based on the obtained first and second time points and the distance between the first and the second sensors.

Figure 2:
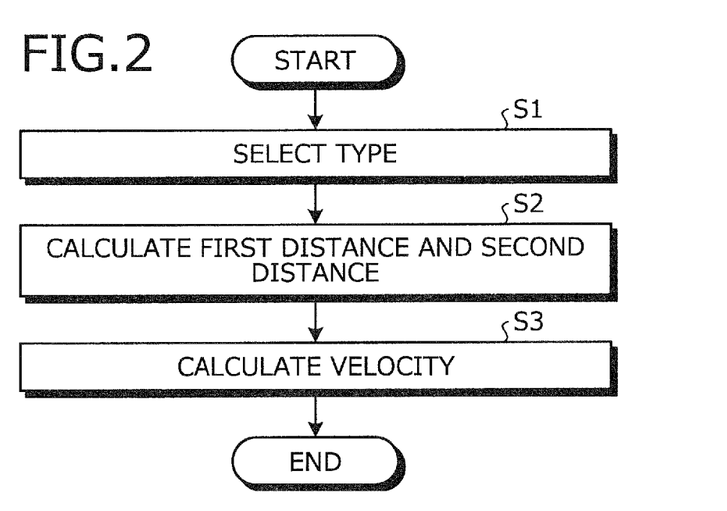
FIG. 2 is a flowchart of a velocity measuring method according to the first embodiment.

FIG. 2 is a flowchart of a velocity measuring method according to the first embodiment. As depicted in FIG. 2, when the electronic apparatus 1 starts the velocity measurement process, the selecting unit 2 selects the type of the object subject to measurement (step S1). For example, the selecting unit 2 may select the type of the object subject to measurement, based on an input from a user.

The distance measuring unit 3 drives the first and the second sensors at measurement time intervals corresponding to the type and cause the sensors to each detect the passing of the object subject to measurement; calculates the first distance to the object subject to measurement, based on the output of the first sensor; and further calculates the second distance to the object subject to measurement, based on the output of the second sensor (step S2).

The calculating unit 4 obtains the first time point at which the object subject to measurement passes the first sensor, based on the first distance calculated by the distance measuring unit 3; obtains the second time point at which the object subject to measurement passes the second sensor, based on the second distance calculated by the distance measuring unit 3; and calculates the velocity of the object subject to measurement, based on the obtained first and second time points and the distance between the first and the second sensors (step S3). The electronic apparatus 1 causes the series of process steps to come to an end.

According to the first embodiment, the selecting unit 2 and the distance measuring unit 3 control the measurement time intervals corresponding to the type of the object subject to measurement and therefore, the passing of the object subject to measurement, by each of the sensors can be detected at a proper timing without being too slow or too fast relative to the velocity of the object subject to measurement. Therefore, the velocity of the object subject to measurement can be measured. The velocity can also be measured of an object subject to measurement whose weight cannot be measured. The velocity can also be measured of an object subject to measurement whose length is not known in advance.

Examples of an apparatus to which the electronic apparatus 1 may be applied include a mobile communication terminal such as a mobile telephone or a smartphone, a computer such as a tablet computer or a notebook computer, and mobile information terminals such as personal digital assistants (PDA); and a watch such as a wrist watch and a measuring device to measure the velocity of a moving object such as a vehicle such as a car. The electronic apparatus 1 can be used as an apparatus for security such as a so-called monitor application to detect that, for example, a person has fallen down because of a disease, etc. and an application to detect, for example, a suspicious person entering a house whose resident is out.

A second embodiment is an example where the electronic apparatus according to the first embodiment is applied to a velocity measuring apparatus implemented as an application in a mobile phone or a smartphone that is an example of the mobile terminal. In the second embodiment, as an example, the description will be made taking a case where, for example, the velocities related to sports such as the velocities of a golf club, a baseball bat, and a tennis racket when swung are measured. In addition to the velocities related to sports, the velocity measuring apparatus can measure the velocities of various moving objects.

Figure 3:
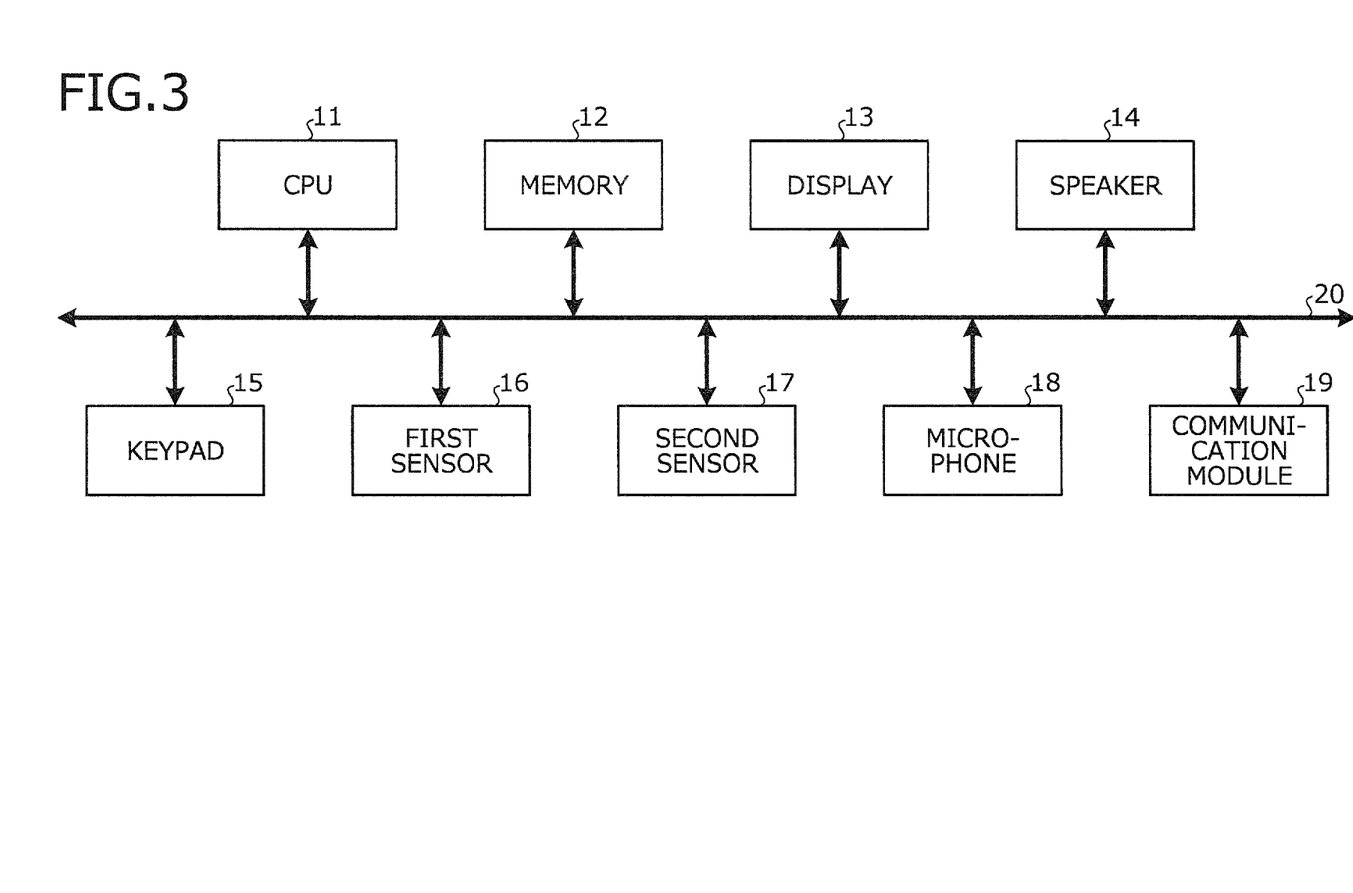
FIG. 3 is a block diagram of a hardware configuration of a mobile terminal according to a second embodiment.

FIG. 3 is a block diagram of a hardware configuration of the mobile terminal according to the second embodiment. As depicted in FIG. 3, the mobile terminal includes a CPU 11, memory 12, a display 13, a speaker 14, a keypad 15, first and second sensors 16 and 17, a microphone 18, and a communication module 19. These components 11 to 19 are connected to a bus 20. The microphone 18, the speaker 14, the communication module 19, etc., may be omitted if the mobile terminal executes no communication using sound.

The CPU 11 executes various programs such as an operating system (OS) and an application program that implements the velocity measuring method described later. The memory 12 includes read only memory (ROM) storing the OS and the application programs; random access memory (RAM) used as a work area of the CPU 11; etc.

The display 13 displays results of execution of the various programs by the CPU 11 using text and images. The speaker 14 outputs the results of the execution of the various programs by the CPU 11 and telephone calls as sound. The keypad 15 receives input through a key operation by a user. The microphone 18 receives audio input from a user.

The communication module 19 communicates with a base station of a mobile telephone system using radio communication; may communicate with an access point of a wireless fidelity (Wi-Fi (registered trademark)) system using radio communication; and may communicate with a base station of a world interoperability for microwave access (WiMAX (registered trademark)) system.

The first and the second sensors 16 and 17 are sensors capable of measuring the distance to the object subject to measurement. For example, the first and the second sensors 16 and 17 may include an optical sensor. For example, the first sensor 16 may include a light emitting element such as a light emitting diode (LED) or a laser diode (LD), and a light receiving element such as a photodiode (PD).

In this case, the first sensor 16 emits, for example, a directional light beam from the light emitting element, under the control of the CPU 11; and using the light receiving element, receives the reflected light beam that has been emitted from the light emitting element, reflected by the object subject to measurement, and returned. The distance from the first sensor 16 to the object subject to measurement can be known from the time period that elapses from the time at which the light emitting element emits the light beam until the time at which the light receiving element receives the reflected light beam, and the velocity of light. The second sensor 17 may be a sensor similar to the first sensor 16. The first and the second sensors 16 and 17 are disposed away from each other in the mobile terminal.

The first and the second sensors 16 and 17 may share a light emitting element therebetween. The reflected light beam emitted from the single light emitting element may be received by the light receiving elements of the first and the second sensors 16 and 17. In this embodiment, description will be made assuming that the first and the second sensors 16 and 17 each include a light emitting element.

Figure 4:
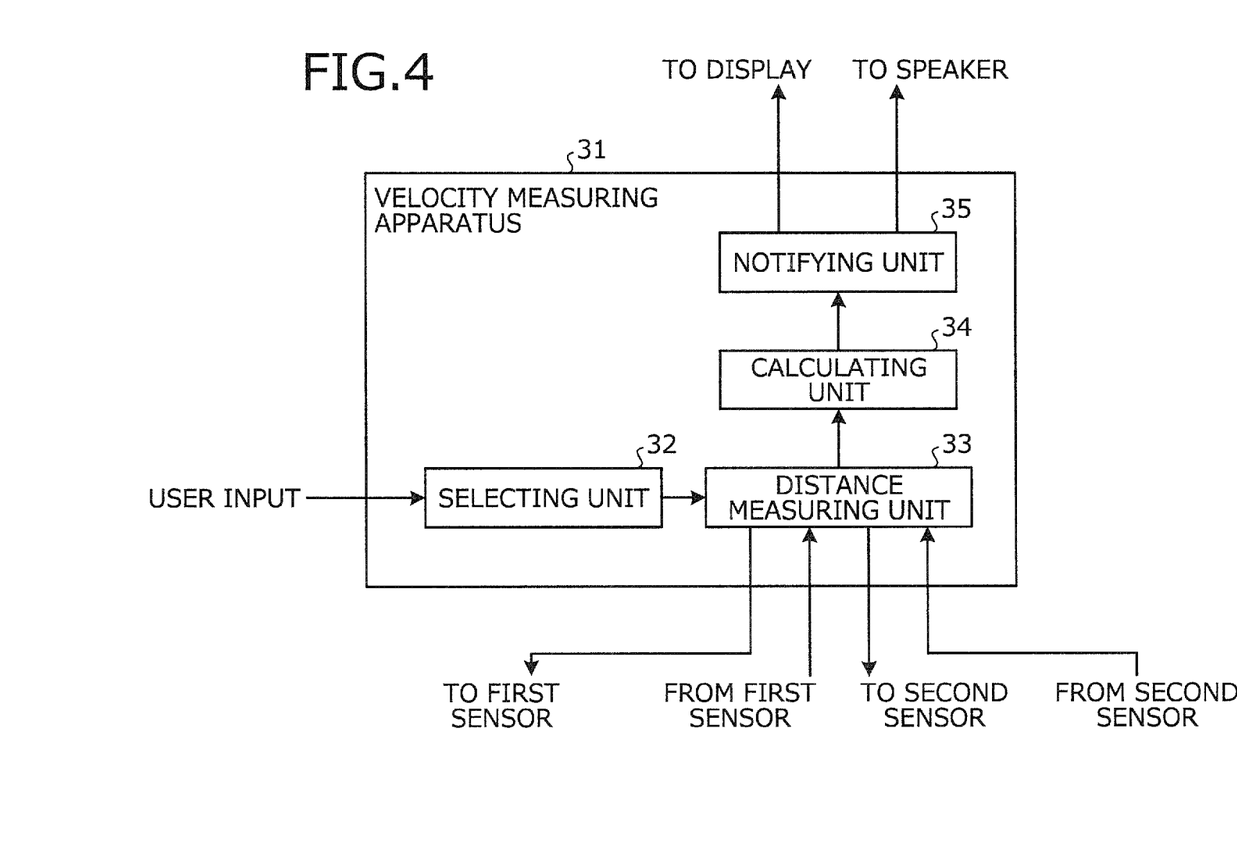
FIG. 4 is a block diagram of a functional configuration of the velocity measuring apparatus in the mobile terminal according to the second embodiment.

FIG. 4 is a block diagram of a functional configuration of the velocity measuring apparatus in the mobile terminal according to the second embodiment. As depicted in FIG. 4, the velocity measuring apparatus 31 is implemented by reading of an application program that implements the velocity measuring method described later from, for example, the memory 12 and the execution of the application program by the CPU 11. The application program not need be stored in the memory 12, and the mobile terminal may read and execute this application program stored to a storage medium such as a CD-ROM. This application program may be stored in another computer (or a server), etc., connected to the mobile terminal through a public line, the Internet, a local area network (LAN), a wide area network (WAN), etc. In this case, the mobile terminal reads the application program from any one of these and executes the application program.

The velocity measuring apparatus 31 includes a selecting unit 32, a distance measuring unit 33, a calculating unit 34, and a notifying unit 35. The selecting unit 32 selects the type of the object subject to measurement, based on an input from a user using, for example, the keypad 15 or the microphone 18 (see FIG. 3).

For example, on the display 13 (see FIG. 3), a message is displayed such as "Select item to be measured: 1. Golf 2. Batting 3. Tennis". When the user selects "1", the selecting unit 32 may output, for example, "00". The selecting unit 32 may output, for example, "01" when the user selects "2" and may output, for example, "10" when the user selects "3".

Figure 5:
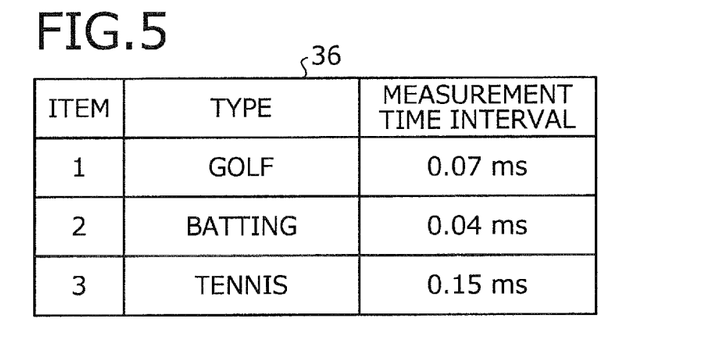
FIG. 5 is a chart of relations between the type of object subject to measurement and measurement time interval, according to the second embodiment.

The distance measuring unit 33 requests the first and the second sensors 16 and 17 to emit a light beam, at measurement time intervals corresponding to the input from the selecting unit 32. The correspondence relation between the type of the object subject to measurement and the measurement time interval may be determined in advance such that the time interval is suitable for the type of the object subject to measurement. For example, the measurement time interval may be decreased when the moving velocity of the object subject to measurement is high, and may be increased when the moving velocity of the object subject to measurement is low. FIG. 5 depicts an example of a table 36 that determines the correspondence relations between the type of the object subject to measurement and the measurement time interval.

FIG. 5 is a chart of relations between the type of the object subject to measurement and the measurement time interval, according to the second embodiment. As depicted in FIG. 5, when with respect to, for example, a golf club, a bat, and a tennis racket, the velocity when each is respectively swung is measured, the measurement time intervals may be, for example, 0.07, 0.04, and 0.15 ms, respectively.

The table 36 determining the correspondence relations between the type of the object subject to measurement and the measurement time interval may be described in the application program that implements the velocity measuring method. The table 36 may be expanded in, for example, the memory 12 by the execution by the CPU 11 of the application program.

The distance measuring unit 33 manages light emission time point for each of the first and the second sensors 16 and 17. The time point at which a light emission request is output to the first and the second sensors 16 and 17 can be used as light emission time point. The distance measuring unit 33 manages light reception time point for each of the first and the second sensors 16 and 17. The time point at which an electronic signal exceeding a noise level is input from the light receiving elements of the first and the second sensors 16 and 17 can be used as light reception time point.

The distance measuring unit 33 obtains the time period that elapses from the time point when the first sensor 16 emits the light beam until the time point when the light beam is received thereby and calculates the distance to the object subject to measurement (a first distance L1) by multiplying the obtained time period by the velocity of light; and further obtains the time period that elapses from the time point when the second sensor 17 emits the light beam until the time point when the light beam is received thereby and calculates the distance to the object subject to measurement (a second distance L2) by multiplying the obtained time period by the velocity of light. The distance measuring unit 33 may calculate the first and the second distances L1 and L2 each time an electronic signal exceeding the noise level is input thereto from the light receiving elements of the first and the second sensors 16 and 17. The distance measuring unit 33 stores the calculated values of the first and the second distances L1 and L2 to, for example, the memory 12.

The distance measuring unit 33 switches between continuous driving (a continuous operation mode) and intermittent driving (an intermittent operation mode) of the first and the second sensors 16 and 17, based on variation of the first distance L1, or variation of the first and the second distances L1 and L2. For example, if the first distance L1, or the first and the second distances L1 and L2 does not/do not vary for a given time period or longer during the continuous operation mode, the distance measuring unit 33 may increase the measurement time interval and may transition to the intermittent operation mode.

If the first distance L1 or the first and the second distances L1 and L2 does not/do not vary for the given time period, no moving object is present in front of the sensors 16 and 17, in other words, this state can be regarded as a state in which the user does not intend to measure velocity. The "given time period" suffices to be a time period by which a state can be regarded as a state in which the user does not intend to measure the velocity, and may be set to be, for example, about 0.5 or about several milliseconds. The measurement time interval in the intermittent operation mode is longer than that in the continuous operation mode. Therefore, the light emission intervals of the first and the second sensors 16 and 17 are increased and accordingly, the light reception intervals are also increased. Therefore, the intervals for the distance measuring unit 33 to calculate the first and the second distances L1 and L2 are also increased.

For example, if the first distance L1, or the first and the second distances L1 and L2 varies/vary during the intermittent operation mode, the distance measuring unit 33 may employ the measurement time interval for the type selected by the selecting unit 32 and may transition to the continuous operation mode. This is because, if the first distance L1, or the first and the second distances L1 and L2 varies/vary, the state can be regarded as a state where the user intends to measure the velocity such as a state where the user stands in front of the sensors 16 and 17 ready for the measurement.

The calculating unit 34 obtains the values of the first and the second distances L1 and L2 from, for example, the memory 12. The calculating unit 34 may determine that the object subject to measurement passes in front of the first sensor 16 when the value of the first distance L1 changes to a value smaller than the previous value, this small value continues for the given time period or longer, and thereafter, the value changes to a value greater than this small value. The same holds for the second distance L2 and the second sensor 17. This is based on the variation of the state as below.

Figure 6:
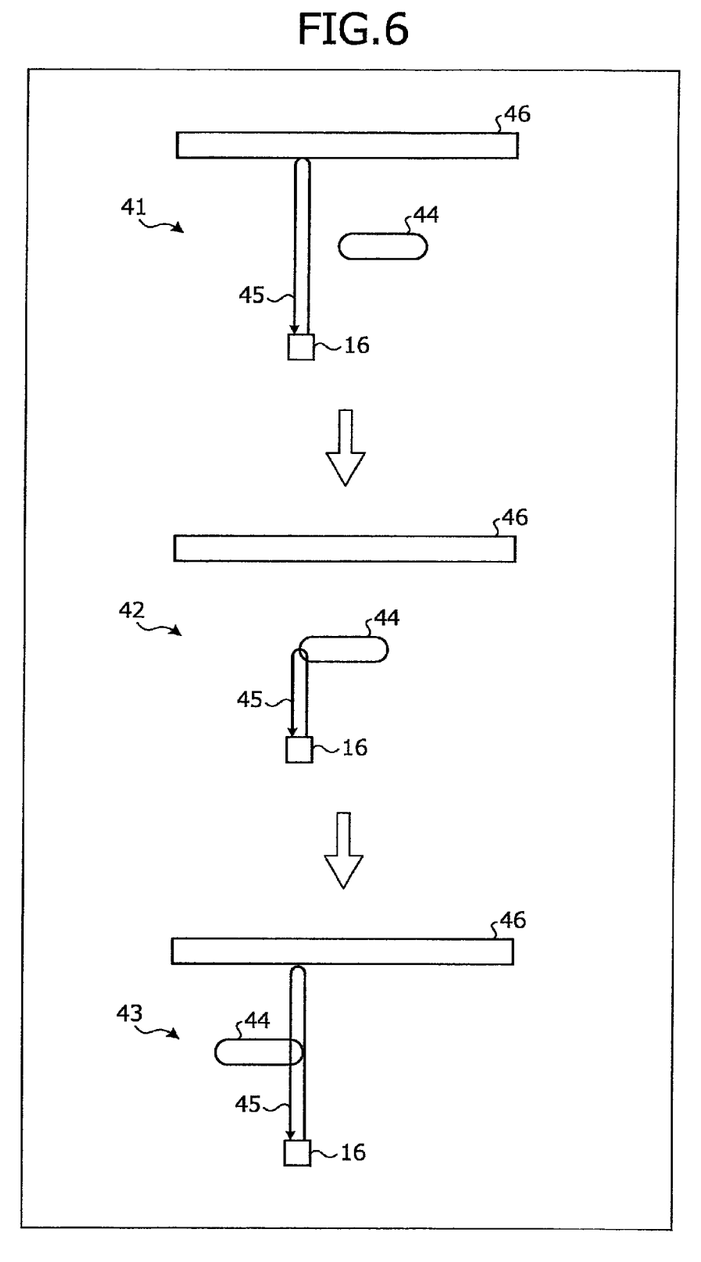
FIG. 6 is a schematic diagram of positional relations between sensors of the mobile terminal and the object subject to measurement according to the second embodiment.

FIG. 6 is a schematic diagram of positional relations between the sensors of the mobile terminal and the object subject to measurement according to the second embodiment. In the state before an object 44 subject to measurement comes in front of the first sensor 16, as depicted in a state 41 in FIG. 6, a light beam 45 emitted from the first sensor 16 is reflected by a wall 46, etc., facing the first sensor 16 and returns. As depicted in a state 42, when the object 44 subject to measurement comes in front of the first sensor 16 and is between the first sensor 16 and the wall 46, etc., the light beam 45 emitted from the first sensor 16 is reflected by the object 44 subject to measurement that is located closer to the first sensor 16 than the wall 46, etc., and returns. Therefore, the value of the first distance L1 changes to a value that is smaller than the value obtained previously when the light beam 45 is reflected by the wall 46, etc.

During the time period during which the object 44 subject to measurement moves transversely in front of the first sensor 16, the distance to the object 44 subject to measurement does not substantially vary and therefore, the value of the first distance L1 remains small. The state continues for the given time period or longer where the value of the first distance L1 is small. If the state where the value of the first distance L1 is small does not continue for the given time period or longer, occurrence of noise in the sensor output, etc., can be considered and therefore, this case is excluded from those to be measured. As depicted in a state 43, when the object 44 subject to measurement has passed the first sensor 16, the light beam 45 emitted from the first sensor 16 is again reflected by the wall 46, etc., facing the first sensor 16, and returned, Therefore, the value of the first distance L1 changes to a value greater than this. The same holds for the second distance L2 and the second sensor 17.

As described, based on the variation of the first and the second distances L1 and L2, the calculating unit 34 can recognize that the object 44 subject to measurement passes transversely in front of the first and the second sensors 16 and 17. When the calculating unit 34 recognizes the passing of the object 44 subject to measurement from the variation of the first distance L1, the calculating unit 34 retains, as a first time point T1, the time point at which the first distance L1 changes to a smaller value (see FIG. 6, in the state 42). When the calculating unit 34 recognizes the passing of the object 44 subject to measurement from the variation of the second distance L2, the calculating unit 34 retains, as a second time point T2, the time point at which the second distance L2 changes to a smaller value (see FIG. 6, in the state 42).

When the calculating unit 34 recognizes the passing of the object 44 subject to measurement from the variation of the first distance L1, the calculating unit 34 retains, as a third time point T3, the time point at which the first distance L1 changes to a larger value after the first distance L1 remains to be the small value for the given time period or longer (see FIG. 6, in the state 43). When the calculating unit 34 recognizes the passing of the object 44 subject to measurement from the variation of the second distance L2, the calculating unit 34 retains, as a fourth time point T4, the time point at which the second distance L2 changes to a greater value after the second distance L2 remains to be the smaller value for the given time period or longer (see FIG. 6, in the state 43).

The calculating unit 34 calculates moving time periods Tsh and Tln of the object subject to measurement from equations (1) and (2) below. The "moving time period Tsh" is a time period necessary for the front end of the object subject to measurement to travel the distance between the first and the second sensors 16 and 17 in the direction of the travel of the object subject to measurement. The "moving time period Tln" is a time period necessary for the rear end of the object subject to measurement to travel the distance between the first and the second sensors 16 and 17 in the direction of the travel of the object subject to measurement.

$$Tsh=|T1-T2| \qquad (1)$$

$$Tln=|T3-T4| \qquad (2)$$

The calculating unit 34 may further calculate the average value T of the Tsh and Tln from equation (3) below and may employ the average value T as the moving time period of the object subject to measurement. The calculating unit 34 may calculate the velocity V of the object subject to measurement from the calculated moving time period T and the distance L between the first and the second sensors 16 and 17, as expressed by equation (4) below.

$$T=(Tsh+Tln)/2 \qquad (3)$$

$$V=L/T \qquad (4)$$

The calculating unit 34 may obtain the velocity V of the object subject to measurement using either Tsh or Tln. The calculating unit 34 does not need to retain T3 and T4 when only Tsh is used, and does not need to retain T1 and T2 when only Tln is used. The calculating unit 34 outputs the calculated value of the velocity V to the notifying unit 35.

The notifying unit 35 may display the value of the velocity V obtained from the calculating unit 34 as information expressed by, for example, text or an image on the display 13. When the value is displayed on the display 13, the notifying unit 35 executes a display process necessary for displaying the value on the display 13. The notifying unit 35 may output the value of the velocity V from, for example, the speaker 14 as sound. When the value is output from the speaker 14 as the sound, the notifying unit 35 executes a synthesis process and a reading process of the sound.

Figure 7:
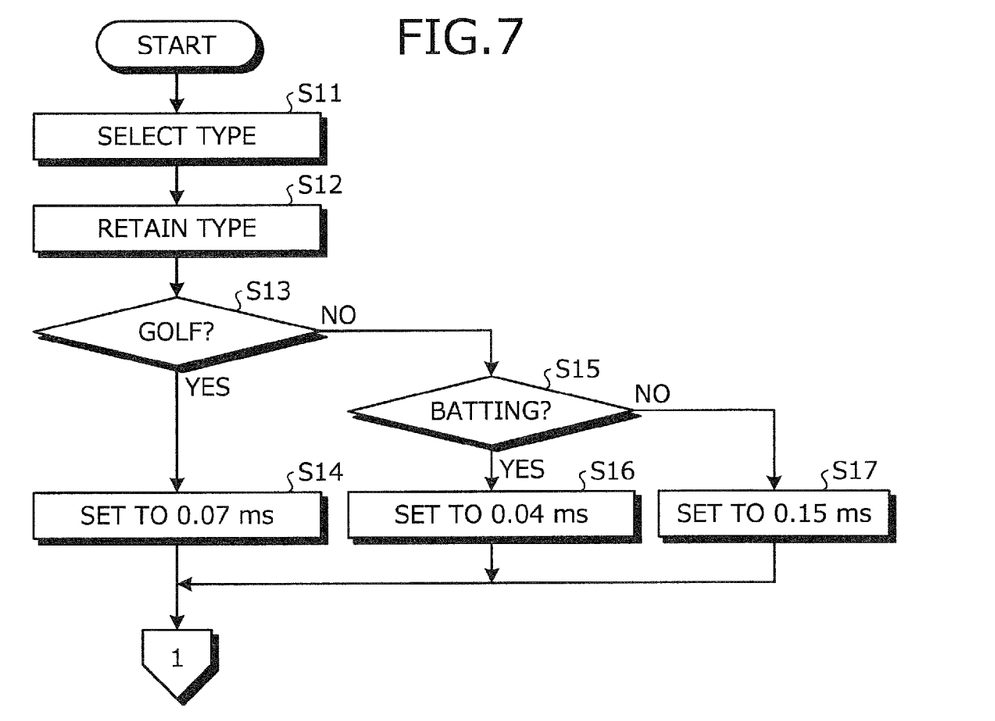
FIG. 7 is a flowchart of the velocity measuring method according to the second embodiment.
Figure 8:
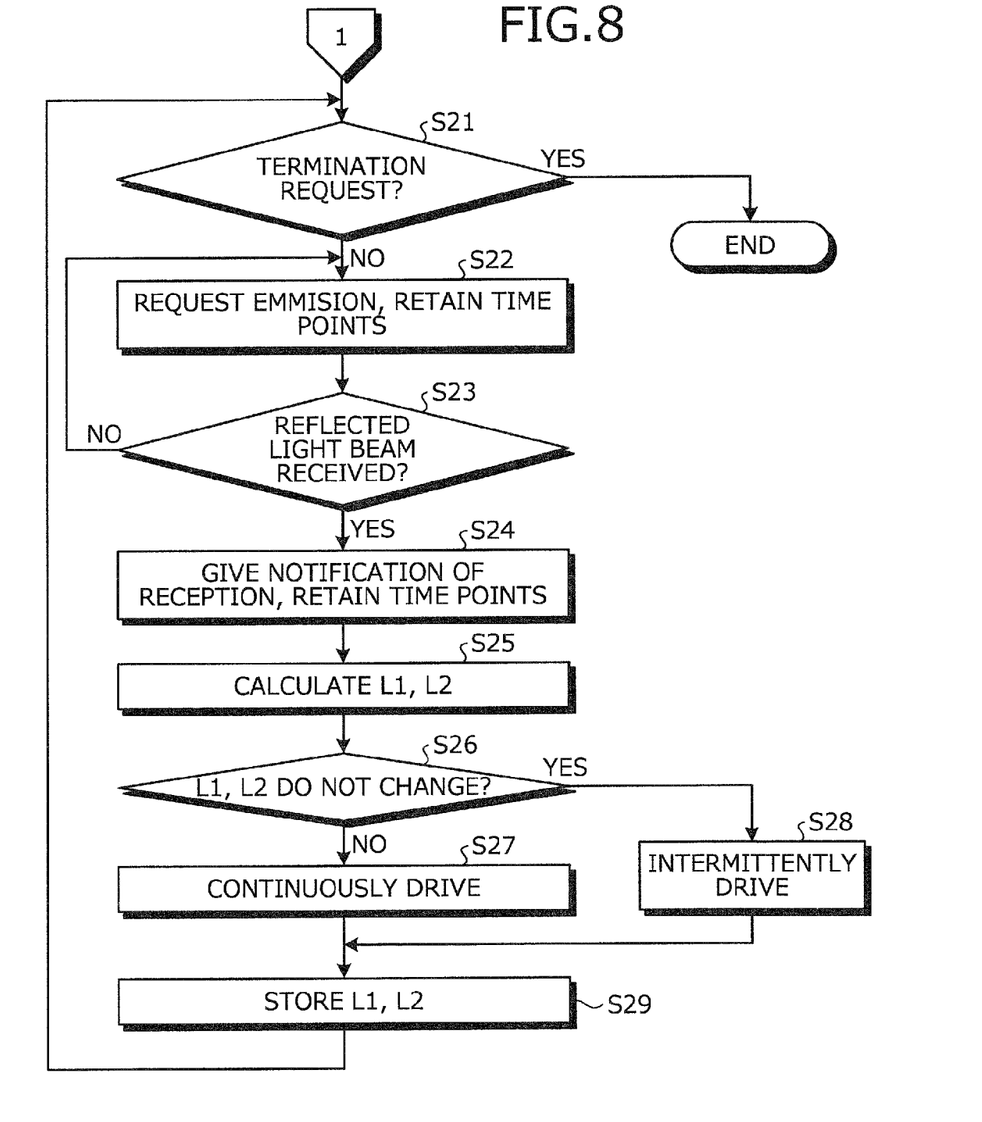
FIG. 8 is a flowchart of the velocity measuring method according to the second embodiment.
Figure 9:
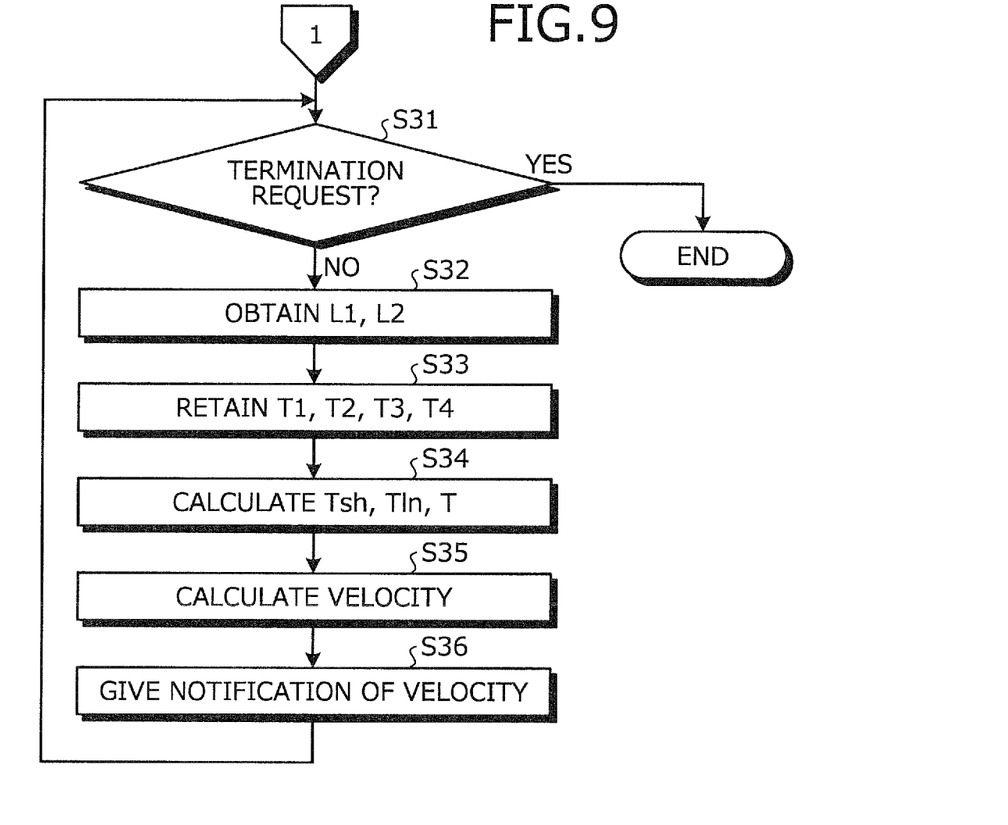
FIG. 9 is a flowchart of the velocity measuring method according to the second embodiment.

FIG. 7 is a flowchart of the velocity measuring method according to the second embodiment. FIGS. 8 and 9 are flowcharts of the parts that are continued from that of FIG. 7. As depicted in FIG. 7, when the velocity measuring apparatus 31 starts the velocity measuring method, the user inputs the type of the object subject to measurement. The selecting unit 32 selects the type of the object subject to measurement, based on the input by the user (step S11) and retains the type of the object subject to measurement (step S12).

If the type of the object subject to measurement is the swinging of golf club (step S13: YES), the distance measuring unit 33 sets the measurement time interval to be, for example, 0.07 ms (step S14). On the other hand, if the type of the object subject to measurement is not the swinging of a golf club (step S13: NO) and is the swinging of a bat (batting) (step S15: YES), the distance measuring unit 33 sets the measurement time interval to be, for example, 0.04 ms (step S16).

If the type of the object subject to measurement is not the swinging of a golf club (step S13: NO) and is not the swinging of a bat (step S15: NO), the distance measuring unit 33 sets the measurement time interval to be, for example, 0.15 ms, which is suitable for, for example, the swinging of a tennis racket (step S17). Thereafter, the processing by the distance measuring unit 33 and the processing by the calculating unit 34 are executed in parallel.

The processing by the distance measuring unit 33 will first be described. When the measurement time interval has been set (step S14, S16, or S17) and, as depicted in FIG. 8, a request to terminate the processing is issued from, for example, the user (step S21: YES), the distance measuring unit 33 causes the series of process steps of the velocity measurement process to come to an end. On the other hand, for example, if no request to terminate the processing is issued from the user (step S21: NO), the distance measuring unit 33 requests the first and the second sensors 16 and 17 to emit a light beam, and retains the time points at which the first and the second sensors 16 and 17 emit the light beams (step S22). The time point at which the distance measuring unit 33 outputs the request for the emission of the light beams may be retained as the time point of the light beam emission.

If no electronic signal consequent to the reception of the reflected light beam from any of the first and the second sensors 16 and 17 is input into the distance measuring unit 33 after the distance measuring unit 33 outputs the request for the emission of the light beams (step S23: NO), the distance measuring unit 33 requests the first and the second sensors 16 and 17 to emit a light beam and retains the time points of the emission of the light beams (step S22). If an electronic signal consequent to the reception of the reflected light beam is input into the distance measuring unit 33 as a notification of reception of the reflected light beams by the first and the second sensors 16 and 17 (step S23: YES), the distance measuring unit 33 retains the time points at which the first and the second sensors 16 and 17 receive the reflected light beams (step S24). The time points at which the electronic signals are input consequent to the reception of the reflected light beams by the first and the second sensors 16 and 17 may be retained as the time points of the reception of the reflected light beams.

The distance measuring unit 33 calculates the time period that elapses from the light beam emission until the light reception by the first sensor 16 and calculates the first distance L1 to the object subject to measurement; and further calculates the time period that elapses from the light beam emission until the light reception by the second sensor 17 and calculates the second distance L2 to the object subject to measurement (step S25).

If the calculated first and second distances L1 and L2 vary (step S26: NO), the distance measuring unit 33 continuously drives the first and the second sensors 16 and (step S27). The distance measuring unit 33 requests the first and the second sensors 16 and 17 to emit light beams at the measurement time intervals for the type retained at step S12; receives electronic signals consequent to the reception of the reflected light beams as responses to the request; and calculates the first and the second distances L1 and l2.

On the other hand, if the first and the second distances L1 and L2 do not vary for the given time period or longer (step S26: YES), the distance measuring unit 33 intermittently drives the first and the second sensors 16 and 17 (step S28). The distance measuring unit 33 requests the first and the second sensors 16 and 17 to emit light beams at intervals that are longer than the measurement time intervals for the type retained at step S12; receives electronic signals consequent to the reception of the reflected light beams as responses to the request; and calculates the first and the second distances L1 and L2.

The distance measuring unit 33 stores the values of the first and the second distances L1 and L2 to, for example, the memory 12 (step S29), returns to the process at step S21, and repeats the processes at steps S21 to S29 until the user issues a request to terminate the processing. The process at step S29 may be executed between the processes at steps S25 and S26.

If the first and the second sensors 16 and 17 are intermittently driven, configuration may be such that the distance measuring unit 33 requests only the first sensor 16 to emit the light beam (step S22); calculates only the first distance L1 (step S25); and switches between the continuous driving and the intermittent driving of the first and the second sensors 16 and 17 based only on the variation of the first distance L1 (steps S27 and S28).

The processing by the calculating unit 34 will be described next. When the measurement time interval has been set (step S14, S16, or S17) and, as depicted in FIG. 9, a request to terminate the processing is issued from, for example, the user (step S31: YES), the calculating unit 34 causes the series of process steps of the velocity measurement process to come to an end. On the other hand, for example, if no request to terminate the processing is issued from, for example, the user (step S31: NO), the calculating unit 34 obtains the values of the first and the second distances L1 and L2 from, for example, the memory 12 (step S32).

The calculating unit 34 retains the first, the second, the third, and the fourth time points T1, T2, T3, and T4 based on the variations of the first and the second distances L1 and L2 (step S33), calculates the moving time periods Tsh and Tln from equations (1) to (3), and calculates the average value T thereof (step S34).

From equation (4), the calculating unit 34 calculates the velocity V of the object subject to measurement (step S35) and notifies the notifying unit 35 of the velocity V of the object subject to measurement (step S36). Thus, the notifying unit 35 displays on the display 13, the velocity V of the object subject to measurement or outputs the velocity V from the speaker 14 by sound. The calculating unit 34 returns to the process at step S31 and repeats the processes at steps S31 to S36 until the user issues a request to terminate the processing.

Immediately after the velocity measuring method is started, the memory 12 does not have the first and the second distances L1 and L2 stored therein and therefore, processes at steps S32 to S36 are not executed. After the distance measuring unit 33 stores the first and the second distances L1 and L2 to the memory 12, the calculating unit 34 executes the processes at steps S32 to S36.

According to the second embodiment, the same effect as that of the first embodiment is achieved. According to the second embodiment, the light emission intervals of the first and the second sensors 16 and 17 are increased during the intermittent operation mode and, associated with this, the execution intervals of the calculation processes by the distance measuring unit 33 and the calculating unit 34 are also increased. Therefore, power consumption can be reduced. The velocity of the object subject to measurement can be measured even when no expensive sensor is used such as a millimeter wave sensor or an ultrasonic sensor. Therefore, the battery life of the velocity measuring apparatus 31 and that of a mobile terminal equipped with the velocity measuring apparatus 31 can be extended. The velocity measuring apparatus 31 and the mobile terminal equipped with the velocity measuring apparatus 31 can be inexpensively provided.

According to the electronic apparatus, the mobile terminal, and the velocity measuring method, an effect is achieved that the velocity of an object subject to measurement can be measured.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An electronic apparatus comprising a processor configured to:
   select a type of an object subject to measurement;
   calculate, at measurement time intervals corresponding to the type, a first distance to the object subject to measurement, based on an output of a first sensor configured to detect passing of the object subject to measurement;
   calculate, at the measurement time intervals, a second distance to the object subject to measurement, based on an output of a second sensor configured to detect passing of the object subject to measurement;
   obtain based on a variation of the first distance, a first time point at which the object subject to measurement passes the first sensor;
   obtain based on a variation of the second distance, a second time point at which the object subject to measurement passes the second sensor; and
   calculate based on the first and the second time points and a distance between the first and the second sensors, a velocity of the object subject to measurement.

2. The electronic apparatus according to claim 1, wherein the processor switches between continuous driving and intermittent driving of the first and the second sensors, based on one or both of the variations of the first and the second distances.

3. The electronic apparatus according to claim 2, wherein the measurement time intervals for the intermittent driving are longer than the measurement time intervals for the continuous driving.

4. A mobile terminal comprising:

a processor configured to select a type of an object subject to measurement;

a first sensor configured to detect passing of the object subject to measurement; and a second sensor configured to detect passing of the object subject to measurement, wherein the processor is further configured to calculate, at measurement time intervals corresponding to the type, a first distance to the object subject to measurement, based on an output of the first sensor;

calculate, at the measurement time intervals, a second distance to the object subject to measurement, based on an output of the second sensor;

obtain a first time point at which the object subject to measurement passes the first sensor based on a variation of the first distance;

obtain a second time point at which the object subject to measurement passes the second sensor based on a variation of the second distance; and calculate a velocity of the object subject to measurement, based on the first and the second time points and a distance between the first and the second sensors; and the velocity and a speaker configured to generate sound according to the velocity the processor drives the first and the second sensors at measurement time intervals corresponding to the type, and causes the first and the second sensors to detect the passing of the object subject to measurement.

5. The mobile terminal according to claim 4, wherein the processor recognizes that the object subject to measurement has passed the first sensor, based on a variation of the first distance and recognizes that the object subject to measurement has passed the second sensor based on a variation of the second distance.

6. The mobile terminal according to claim 4, wherein the first and the second sensors are optical sensors, and the processor calculates the first and the second distances, based on time period elapsing until the optical sensors receive a light beam reflected by the object subject to measurement.

7. The mobile terminal according to claim 4, wherein the processor switches between continuous driving and intermittent driving of the first and the second sensors, based on one or both of the variations of the first and the second distances.

8. The mobile terminal according to claim 7, wherein the measurement time intervals for the intermittent driving are longer than the measurement time intervals for the continuous driving.

9. A velocity measuring method comprising:

selecting a type of an object subject to measurement;

driving and causing a first sensor and a second sensor to detect passing of the object subject to measurement, the first and the second sensors configured to detect the passing of the object subject to measurement;

calculating at measurement time intervals corresponding to the type, based on an output of the first sensor, a first distance to the object subject to measurement;

calculating, at the measurement time intervals, based on an output of the second sensor, a second distance to the object subject to measurement;

obtaining based on a variation of the first distance, a first time point at which the object subject to measurement passes the first sensor;

obtaining based on a variation of the second distance, a second time point at which the object subject to measurement passes the second sensor; and calculating based on the first and the second time points and a distance between the first and the second sensors, a velocity of the object subject to measurement, wherein the velocity measuring method is executed by a processor.

* * * * *